Figure 1:

March 26, 1963  R. G. FLOWERS ETAL  3,083,119
THERMALLY STABLE LAYER INSULATION
Filed May 1, 1961

Inventors,
Ralph G. Flowers,
Paul W. Juneau, Jr.,
by Francis K. Doyle
Their Attorney.

United States Patent Office 3,083,119
Patented Mar. 26, 1963

3,083,119
THERMALLY STABLE LAYER INSULATION
Ralph G. Flowers, Pittsfield, Mass., and Paul W. Juneau,
Jr., Norristown, Pa., assignors to General Electric Company, a corporation of New York
Filed May 1, 1961, Ser. No. 106,707
4 Claims. (Cl. 117—155)

This invention relates to electrical apparatus and more particularly to thermally stable layer insulation for use in such electrical apparatus.

In recent years, in the art pertaining to electrical apparatus, many attempts have been made to thermally stabilize or thermally up-rate such apparatus to provide a long-lived apparatus with a higher operating limit to such apparatus. By thermally stabilized or thermally up-rated, as used throughout this specification and claims, it is meant increasing the temperature at which the apparatus may be operated without decreasing the useful life of the electrical apparatus, as compared to conventional electrical apparatus. Of course, it will be understood that increasing the ability of various components of an electrical apparatus to withstand high temperatures would thereby aid in thermally uprating such electrical apparatus. Thus, the terms thermally uprated or thermally stabilized will also be used hereafter to refer to components for use in an electrical apparatus, where such components have been modified to enable them to operate at higher temperatures without decreasing their useful life. Typical examples of such electrical apparatus are network transformers, distribution transformers, and power transformers. Of course, it will be understood, that many other types of electromagnetic apparatus as well as many types of electrical apparatus are included, such as power cables, high voltage electrical bushings, and the like. These attempts at thermally uprating have been especially directed to electrical apparatus which utilizes a liquid dielectric in a hermetically sealed enclosure.

It has been discovered that the cellulosic insulation used in such hermetically sealed electrical apparatus apparently decomposes or deteriorates from the heat of the apparatus, to form water. This formation of water, in general, leads to the deterioration of substantially the entire insulation system of the electrical apparatus. Recently it has been discovered that cellulosic insulation in such hermetically sealed electrical apparatus can be thermally stabilized or thermally up-rated. The manner in which this can be obtained, and the advantages thereof, is more clearly pointed out in application Serial No. 849,358, filed October 28, 1959, in the names of Raab and Lipsey and application Serial No. 44,344, filed July 21, 1960, in the names of Raab and Lipsey, both applications being assigned to the same assignee as this application, the above applications now abandoned, having been replaced by continuation-in-part application Serial No. 221,649, filed August 15, 1962, in the names of Raab and Lipsey and being assigned to the same assignee as this application.

As is well known to those skilled in the art, in such electrical apparatus, especially where coils are utilized, the coils are generally secured to the cellulosic insulation, usually in the form of paper insulation, to provide a rigid structure, by means of a shellac coating on the cellulosic paper insulation. These shellac coatings apparently decompose during the operation of the electrical apparatus, by the heat which is generated therein, to produce water in the same manner as the cellulosic insulation. It has been recently found that by use of certain types of coatings that unexpectedly, substantially improved thermal stabilization of the coated cellulosic paper insulation may be obtained.

It is, therefore, a principal object of this invention to provide a thermally stabilized coated cellulosic paper insulation for use in electrical apparatus.

It is a further object of this invention to provide thermally stabilized cellulosic paper insulation for electrical apparatus by placing a thermally stable coating on a cellulosic paper insulation which has been previously thermally up-rated.

In carrying out this invention in one form, there is provided an improved thermally stabilized coated cellulosic paper insulation obtained by coating a thermally stable cellulosic paper insulation with a coating of resin obtained from combining ethoxyline resin, shellac, and a catalyst or hardener selected from the group consisting of N,N-diallyl melamine, melamine formaldehyde and dicyandiamide. The thermally stabilized cellulosic paper insulation coated with the indicated resin has been found to have thermal properties which are almost equal to those of the thermally stabilized cellulosic paper insulation.

Figure 2:
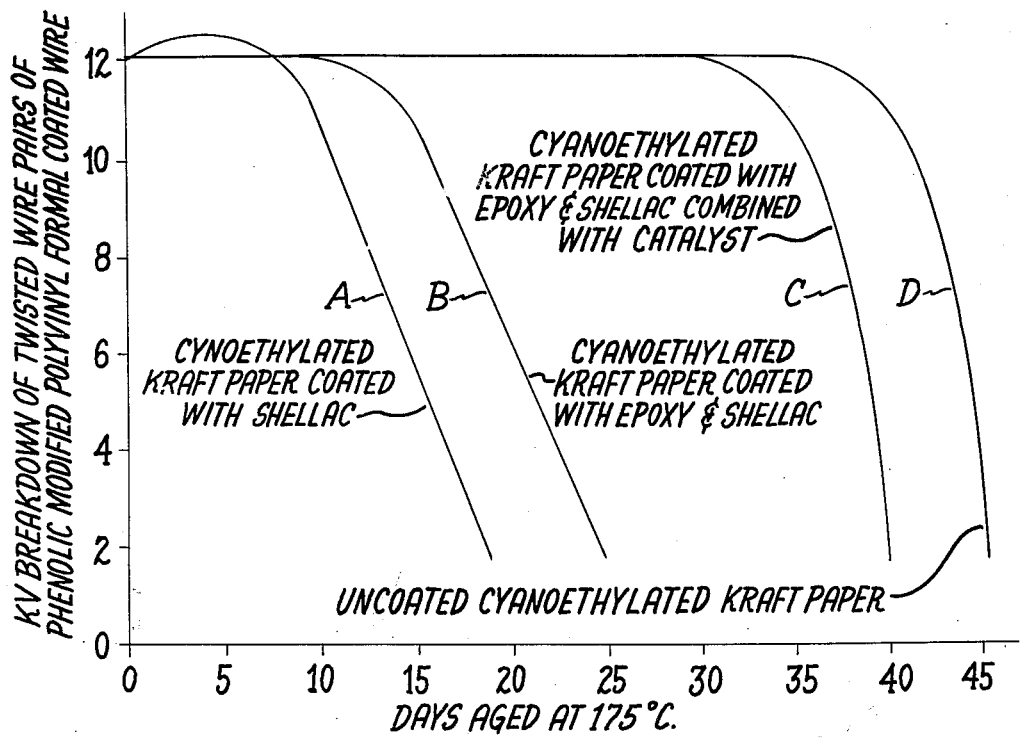

The invention which is sought to be protected will be specifically pointed out in the claims appended hereto. However, it is believed that this invention, and the manner in which its objects and advantages are obtained, as well as other objects and advantages thereof, will be better understood from the following description especially when taken in connection with the accompanying drawing wherein:

FIGURE 1 is an enlarged edge view of a sheet of coated paper insulation according to this invention; and FIGURE 2 is a graphic presentation of the comparative effects of cyanoethylated paper, when coated with various types of coatings, on the dielectric strength retention characteristics of phenolic modified polyvinyl formal coated wire when aged in transformer oil at a temperature of 175° C.

As previously noted, this invention comprises a thermally stabilized paper insulation, coated with a thermally stabilized resinous coating, the coating being obtained from the combination of an ethoxyline resin with shellac and a suitable catalyst or hardener selected from the group consisting of N,N-diallyl melamine, melamine formaldehyde and dicyandiamide. The ethoxyline resins which may be used in practicing this invention, which are also known as epoxides or epoxy resins, are described, for example, in U.S. Patent 2,324,483, Castan, as comprising the products of reaction of a phenol having at least two phenolic hydroxy groups and an epihalogenohydrin, e.g., epichlorohydrin, in which the said product contains at least two ethylene oxide groups.

The ethoxyline resins, which may be defined generally as being complex epoxide resins comprising a polyether derivative of a polyhydric organic compound containing epoxy groups, are also disclosed in various places in the art. Among such references may be mentioned, in addition to the aforesaid Castan Patent 2,324,483, Castan Patent 2,444,333, British Patent 518,057, and British Patent 579,698. For the most part, these ethoxyline resins are based on the resinous product of reaction between the epihalogenohydrin, for instance, epichlorohydrin, and a phenol having at least two phenolic hydroxy groups, for example, bis-(4-hydroxy-phenyl) dimethylmethane. U.S. Patents 2,494,295, 2,500,600 and 2,511,913, also describe examples of ethoxyline resinous compositions which may be employed in the practice of the present invention. By reference, the aforementioned patents are intended to be part of the present description of the ethoxyline resins used and, for brevity, the ethoxyline resins will not be described other than that they contain more than one ethylene oxide group, e.g., from 1 to 2 or more epoxide groups per molecule, and are prepared by effecting reaction between a polyhydric phenol, for example, hydroquinone, resorcinol, and condensation products of phenols with ketone, for instance, bis-(4-hydroxyphenyl)-2,2-propane, with epichlorohydrin. Many of these ethoxyline resins are sold under the name of Epon resins by Shell Chemical Corporation, or Araldite resins by the Ciba Company. Another type of ethoxyline resin suitable for use in the present invention is sold under the name Cardolite by the Irvington Varnish and Insulator Company, a division of Minnesota Mining and Manufacturing Company.

In many tests which have been made on thermally stabilized paper insulation, with various types of coatings thereon, it has been found that the dielectric strength retention characteristics of phenolic modified polyvinyl formal coated wire, when aged in transformer oil at a temperature of 175° C. with such coated paper, rapidly breaks down when a shellac coating is used or when a coating comprises epoxy and a shellac are used. It will be clear to those skilled in this art that the dielectric strength retention characteristics of coated wire used in electrical apparatus is one means of measuring the thermal stability of the electrical apparatus. Obviously, when the coated wire loses its dielectric strength, its current carrying capacity is substantially lost and the electrical apparatus will tend to fail through a short-circuit failure. Thus, by measuring this characteristic of coated wire in the presence of paper insulation having various coatings on the insulation, a measure of the thermal stability of such coated paper may be obtained.

This is graphically illustrated in FIGURE 2 where curve A represents the dielectric strength retention characteristics of the coated wire when aged in transformer oil at 175° C. with shellac coated cyanoethylated kraft paper. Curve B illustrates the dielectric strength retention characteristics when an epoxy and shellac coated cyanoethylated kraft paper is used. From an observation of the curves A and B, it can be readily seen that the dielectric strength retention characteristics of the phenolic modified polyvinyl formal coated wire drops off very rapidly when aged in transformer oil with either shellac coated cyanoethylated kraft paper or epoxy and shellac coated cyanoethylated kraft paper. As will be well understood, this rapid drop off of the dielectric strength retention characteristics of the coated wire substantially detracts from the thermal characteristics of electrical apparatus using such cyanoethylated kraft paper when coated with either shellac or epoxy and shellac.

In accordance with this present invention, it has been discovered that if the coating resin is formed of epoxy and shellac, combined with a catalyst or hardener selected from the group consisting of dicyandiamide, N,N-diallyl melamine, and melamine formaldehyde, that the dielectric strength retention characteristics of the coated wire will, unexpectedly, be substantially increased. This is graphically indicated by the curve C in FIGURE 2. As will be noted, curve C is approximately equal in its effect on the dielectric strength retention characteristics of coated wire with uncoated cyanoethylated kraft paper, which is indicated by curve D in FIGURE 2. Thus it can be seen that by means of the resin coated paper insulation of this invention that the dielectric strength retention characteristics of phenolic modified polyvinyl formal coated wire is substantially increased over other types of well known coated paper insulation by a factor of 3 to 4 times. The increase in the dielectric strength retention characteristic of phenolic modified polyvinyl formal coated wire when aged with coated paper insulation according to this invention is unexpected, inasmuch as many well known epoxy resin hardeners have been tried in combination with epoxy and shellac in coating paper insulation, but such coated paper insulation has shown substantially the same results, at best, as those for epoxy and shellac coated insulation, as indicated by curve B in FIGURE 2.

The coating composition of this invention may be prepared by dissolving the ethoxyline resin, the shellac and a catalyst or hardener selected from the group consisting of N,N-diallyl melamine, melamine formaldehyde and dicyandiamide in a common solvent such as, for example, ethylene glycol monoethylether. The solution thus obtained can be applied to the thermally stabilized paper insulation in any desired manner, such as, for example, by means of spraying, brushing, or the like. As indicated in FIGURE 1, the coating 10 on the thermally stabilized paper insulation 12 is bonded substantially to the surface of the paper but does not penetrate the paper, thereby allowing the paper to be utilized to carry the dielectric fluid used as an insulation material into the paper, thus improving the dielectric strength of the paper, in a manner well known by those skilled in this art.

As an example of one resin coated paper insulation made in accordance with this invention, 105 grams of a shellac were combined with 157 grams of an epoxide resin and 7½ grams of N,N-diallyl melamine. The above were dissolved in 538 grams of ethylene glycol monoethylether. The solution thus obtained was then brush coated on a sheet of cyanoethylated kraft paper approximately .010″ thick. The coated paper was dried to remove substantially all of the solvent. The resin coating was then cured by heating the coated paper for approximately 4 hours at approximately 125° centigrade. The resultant coated paper when aged in transformer oil at 175° C., with a twisted wire pair of phenolic modified polyvinyl formal coated wire conformed substantially to curve C of FIGURE 2.

A second resin coated paper insulation according to this invention was made by dissolving 105 grams of shellac, 157 grams of ethoxyline resin, and 7½ grams of melamine formaldehyde in 393 grams of trichloroethylene and 145 grams of ethanol. The resulting solution was then coated on a sheet of cyanoethylated kraft paper approximately .010″ thick, dried to remove substantially all of the solvent and then cured at approximately 125° centigrade for 4 hours. When tested, the aging characteristics of such coated cyanoethylated kraft paper with a twisted coated wire pair conformed substantially to curve C of FIGURE 2.

The following is a further example of a resin coated thermally stable paper insulation, made according to this invention. 105 parts by weight of shellac, 26 parts by weight of an epoxide resin and 3¾ parts by weight of dicyandiamide were dissolved in 220 parts by weight of a solvent. The solution obtained was coated on a sheet of cyanoethylated kraft paper approximately .010″ thick. The coated paper was dried to remove substantially all of the solvent and was then cured for approximately 4 hours at a temperature of 125° C. The aging characteristics of the paper, when aged with phenolic modified polyvinyl formal coated wire, were substantially the same as those shown in curve C of FIGURE 2. It has been found that when any of the above noted materials are combined in the approximate range of proportions of 1–10 percent by weight, with shellac in the range of 25–90 percent by weight, and an ethoxyline resin of a range of 9–70 percent by weight that the resultant solution obtained, when coated on thermally stabilized paper insulation material, will provide thermal aging characteristics substantially as indicated in curve C of FIGURE 2. The particular range of shellac and epoxy resin used are not critical. However, when less than 25 percent by weight of shellac or more than 70 percent by weight of epoxy resin is used the solution is not sufficiently viscous for proper application to the insulation. Such low viscosity solutions tend to run through the insulation, providing little or no surface coating thereon. At least 9 percent by weight of epoxy resin is necessary to obtain the desired thermal stability characteristics indicated by curve C of FIGURE 2. At least 1 percent by weight of the indicated catalyst materials is similarly required to obtain these desired thermal characteristics. The 10 percent by weight limit is required, since with higher quantities, free amounts of the catalyst material remain on the surface of the insulation. This material will then mix with the dielectric fluid of the electrical apparatus, thus contaminating such dielectric.

From the above it will be apparent that when thermally stabilized paper insulation is provided with a coating formed in accordance with this invention that the thermal stability of the coated paper is increased substantially over that of other well known paper insulation coatings. Of course, it will be obvious that the coated cyanoethylated paper according to this invention is particularly advantageous in electrical apparatus which utilizes liquid dielectrics, since the coated insulation does not deteriorate the dielectric strength of wire used in such apparatus as does other well known coated insulations.

While the invention has been described with specific reference to a combination of an ethoxyline resin and specific quantities of shellac and a catalyst, it will be understood that various known filler material and other matters which does not effect essential properties of the resin combination, may be utilized if desired. It will, therefore, be understood that modifications may be made without departing from the scope of the invention as set forth in the appended claims.

What is claimed as new and which it is desired to secure by Letters Patent of the United States is:

1. An article of manufacture comprising: a layer of cyanoethylated paper and a coating thereon of a resin obtained from reacting 9–70% by weight of an ethoxyline resin with 25–90% by weight of a shellac and 1–10% by weight of a catalyst selected from the group consisting of N,N-diallyl melamine, melamine formaldehyde, and dicyandiamide.

2. A thermally stable coated insulation comprising: a layer of paper insulation that has been thermally stabilized and a coating thereon of a resin obtained from reacting approximately 38% by weight of shellac with approximately 59% by weight of epoxide resin and approximately 3% by weight of N,N-diallyl melamine.

3. A thermally stable coated insulation comprising: a layer of paper insulation that has been thermally stabilized and a coating thereon of a resin obtained from reacting approximately 38% by weight of shellac with approximately 59% by weight of epoxide resin and approximately 3% by weight of melamine formaldehyde.

4. A thermally stable coated insulation comprising: a layer of paper insulation that has been thermally stabilized and a coating thereon of approximately 78% by weight of shellac, with approximately 19% by weight of an epoxide resin and approximately 3% by weight of dicyandiamide.

References Cited in the file of this patent
UNITED STATES PATENTS

| | | |
|---|---|---|
| 2,311,911 | Swain et al. | Feb. 23, 1943 |
| 2,769,739 | Flowers et al. | Nov. 6, 1956 |
| 2,899,399 | Flowers | Aug. 11, 1959 |
| 2,913,356 | Schroeder | Nov. 17, 1959 |